Patented Feb. 6, 1951

2,540,311

UNITED STATES PATENT OFFICE 2,540,311

MOTHPROOFING COMPOSITION AND THE APPLICATION THEREOF TO FABRICS FROM DRY CLEANER'S SOLVENT

Ernst A. Wolff, Plainfield, N. J., assignor to Merck & Co., Inc., Rahway, N. J., a corporation of New Jersey No Drawing. Application March 26, 1947, Serial No. 737,438

6 Claims. (Cl. 117—138.5).

This is a continuation-in-part of my pending application, Serial No. 667,477, filed May 4, 1946, now abandoned.

This invention relates to mothproofing of woolen fabrics and other materials composed at least in part of animal fibers and other fibers generally subject to attack by larvae of the clothes moth, carpet beetle, and the like. More particularly, the invention relates to new compositions for treating fabrics or fibrous materials to protect the same against insect attack, and to improved fabrics or fibrous materials thus treated.

It has been known for some time that 1,1-bis-(p - chlorphenyl) -2,2,2-trichloroethane, more commonly referred to as D. D. T., has mothproofing properties, but attempts to use this agent in the treatment of woolen fabrics and other fibrous materials subject to insect attack have been unsatisfactory. There is a marked tendency for this agent to crystallize after application to fabrics causing objectionable "blooming," i. e. discoloration or whitening due to formation of minute crystals of the agent on individual fibers of the material.

I have now discovered that fabrics and fibrous materials can be treated with 1,1-bis-(p-chlorphenyl)-2,2,2-trichloroethane without the objectionable crystallization or "blooming" of this agent by combining the agent with certain resin plasticizers alone or together with certain resins and applying this composition to the fibrous material from a suitable organic solvent, preferably of the type generally used in the dry-cleaning industry. The plasticizer or plasticizer and resin combination acts as a fixative, preventing crystal formation on the treated fibrous material. The new mothproofing compositions of the present invention are prepared by combining a quantity of 1,1 - bis - (p - chlorphenyl)-2,2,2-trichloroethane with about 2 to 15% by weight of a fixative such as a plasticizer, or mixture of plasticizer and resin. Any of a number of plasticizers can be used, but the most suitable plasticizers include dibutyl-phthalate, tri-o-cresyl phosphate, and abietic acid derivatives such as methyl abietate and the like. Resins which are suitable include methacrylate polymers. The use of a resin in my new compositions in combination with a plasticizer has the advantage of imparting a desired "hand" or body to the treated fabric or fibrous material. A similar effect is obtained by employing ethyl cellulose in combination with a plasticizer. When a resin is employed it is preferably used in the ratio of about two parts by weight of plasticizer to one of resin. It will be understood, however, that in treating particular type fabrics it may be desirable to vary this ratio.

As it is impractical from the cost and convenience standpoints to distribute my mothproofing compositions in dilute organic solvent solutions used for impregnation, it is preferable to distribute these compositions as dry powders or concentrated stock solutions. A dry powder is formed by merely milling together the 1,1-bis-(p - chlorphenyl) - 2,2,2-trichloroethane and plasticizer, or plasticizer and resin in the proportions indicated above. Such a powder can readily be dissolved in dry-cleaning solvents, particularly those of the chlorinated hydrocarbon type in the amounts required to provide suitable impregnating solutions.

In dry-cleaning establishments, since cleaning solvents are measured and handled in terms of volume rather than weight, it will be apparent that the use of a stock solution instead of the dry powder makes for somewhat greater convenience. Any of the better solvents for 1,1-bis-(p - chlorphenyl)-2,2,2-trichloroethane, which will not be harmful to fabrics and which have a reasonably high flash point (low fire hazard) can be used in making the stock solutions. Cyclohexanone is an excellent solvent for this purpose although it has one disadvantage in that it is harmful to certain types of rayon fabrics. Thus, cyclohexanone can be used in making stock solutions provided they are to be used only for treatment of woolen fabrics and not for treatment of articles composed of mixed fabrics. While benzene is an excellent solvent for preparing the stock solutions, its use is not recommended from a practical standpoint because of its low flash point and the possibility of increased fire hazard by careless use of stock solutions made with benzene. All factors being considered, the most suitable solvents for use in preparing stock solutions appear to be chlorinated hydrocarbons such as trichlorethylene, tetrachlorethylene, carbon tetrachloride, and the like.

In preparing the stock solution, three to seven pounds of a mixture of 1,1-bis-(p-chlorphenyl)-2,2,2-trichloroethane and plasticizer, or plasticizer and resin, in the relative proportions above mentioned, are dissolved in each gallon of the selected solvent. The optimum amount of solid components to be dissolved in the solvent will vary to some extent, within the above range, depending upon the solubility of 1,1-bis-(p-chlorphenyl)-2,2,2-trichloroethane in the particular solvent which is used.

The new mothproofing compositions are readily applied to fabrics and fibrous materials from organic solvents of the type used in the dry-cleaning industry. These dry-cleaning solvents include hydrocarbons such as Stoddard Solvent solution (a petroleum distillate boiling between 150–200° C. comprising predominantly nonanes and decanes) and other relatively high boiling hydrocarbons which are distributed under various trade names as well as chlorinated hydrocarbons such as trichlorethylene, tetrachlorethylene, carbon tetrachloride and the like. Mothproofing solutions are made with any of these dry-cleaning solvents by merely dissolving a dry concentrate, or mixing a stock solution of the type above described with a solvent in an amount sufficient to bring the concentration of 1,1-bis-(p-chlorphenyl)-2,2,2-trichloroethane in the resulting solution to about 2 to 4% by weight. Such a solution can be used either in the normal dry-cleaning cycle or, if desired, can be used in a separate mothproofing treatment independent of any dry-cleaning process.

The mothproofing composition, i. e. 1,1-bis-(p-chlorphenyl)-2,2,2-trichloroethane and plasticizer, or plasticizer and resin, is not adsorbed upon the fabric and impregnation of the fabric depends upon the residual amount of the impregnating solution which remains on the fabric after centrifuging and prior to final drying. It is found that in most efficient dry-cleaning systems a minimum of 10% of solvent remains in the cloth before drying and, in many instances, the residual solvent is nearly 20% of the weight of the fabric. It will thus be apparent that upon treating a fabric with an impregnating solution containing 2 to 4% of 1,1-bis-(p-chlorphenyl)-2,2,2-trichloroethane, an amount of 1,1-bis-(p-chlorphenyl)-2,2,2-trichloroethane will remain on the fabric after centrifuging equivalent to about .2% to .4% of the weight of the fabric. This is sufficient to afford good protection to the fabric against insect attack which will not be lost in storage or in normal use; and by virtue of the plasticizer, or plasticizer and resin, incorporated on the fabric, together with 1,1-bis-(p-chlorphenyl)-2,2,2-trichloroethane, there is no "blooming" or whitening due to crystal formation.

Washing and dry-cleaning will remove all of the 1,1-bis-(p-chlorphenyl)-2,2,2-trichloroethane and plasticizer, or plasticizer and resin, thus insuring thorough cleansing of fabrics when desired as well as insuring properly controlled protection of fabrics in successive cleaning and impregnating or mothproofing operations.

The following examples show how the process of the present invention can be carried out, but it is to be understood that these examples are given by way of illustration and not of limitation.

*Example I*

In a dry cleaning establishment 55 gal. of Stoddard Solvent was prepared for mothproofing by adding 3 gal. of a stock solution containing 12 lb. of technical (85%) D. D. T. and 0.6 lb. of dibutylphthalate in trichlorethylene. The resulting solution contained approximately 3% of D. D. T. and 0.15% of dibutylphthalate.

Six loads of mixed woolen materials, each weighing 42–44 lb. were then processed in the regular way. Each load was run for 20 min. in a wash-wheel with dry cleaners' soap in the 3% D. D. T. solution. (The D. D. T. was not affected by the soap.) The wheel was then stopped and a small amount of filter aid was added. Then the circulating pump was started and the wheel was run for 25 min., while continuously filtering and recirculating the solvent-D. D. T. solution. The thoroughly cleaned goods were then transferred to a centrifuge and the excess solution was removed. The goods after centrifuging retained 10–15% of solvent which corresponds with a 0.3 to 0.45% residue of D. D. T. on the fabrics. The goods were then transferred to steamheated tumblers for drying, and after that they were steam pressed in the usual way. On inspection by the dry-cleaning management all goods were found to be satisfactory.

Test blanks of wool fabric were mixed with each batch and carried through all stages of the process. These blanks and corresponding untreated blanks were then subjected to insect tests using larvae of clothes moth (C. M.) and carpet beetle (C. B.). One square inch of fabric, in each instance, was exposed to 10 larvae for two weeks and the damage measured in mgm. weight loss. The results of these tests are tabulated below.

| Blank | Treatment | Damage [1] | |
|---|---|---|---|
| | | C. M. | C. B. |
| Standard (white wool) | Untreated | 33.5 | 27.3 |
| | Load #1, 12% retention | −0.3 | −1.1 |
| | Load #3, 12% retention | −0.2 | −0.9 |
| | Load #5, 15% retention | −0.2 | −1.1 |
| | Load #6, 15% retention | −0.2 | −1.2 |
| Grey tweed | Untreated | 40.0 | 27.9 |
| | Load #1 | 0.6 | −1.2 |
| | Load #6 | 1.0 | 0.7 |
| Black Serge | Untreated | 22.6 | 9.9 |
| | Load #1 | −0.1 | −0.6 |
| | Load #6 | −0.2 | −1.7 |

[1] The negative values designate an increase in weight which is due to moisture and/or larvae secretion.

Standard (white) blanks from load #3 were also subjected to tests after spotting with steam and with solvent (since these conditions are sometimes experienced in dry-cleaning establishments). These tests gave the following results:

| Treatment | Damage, C. M. | C. B.[1] |
|---|---|---|
| Unspotted | −0.2 | −0.9 |
| Steam spotted | 2.2 | −0.6 |
| Solvent spotted (D. D. T. reapplied by hand) | 1.8 | −1.2 |

[1] Damage and negative values have significance indicated above.

*Example II*

An impregnation solution was prepared by mixing ½ gal. of a stock solution containing per gal., 4 lb. of technical D. D. T. and 0.2 lb. of dibutylphthalate in trichlorethylene, with about 25 gal. of Stoddard Solvent. The resulting solution contained about 1% of D. D. T. and 0.05% of dibutylphthalate.

A load of mixed woolen goods weighing 20–24 lb. was carried through the normal dry-cleaning cycle. After the usual removal of solvent in the centrifuge, standard (white wool) blanks accompanying the load were distributed to various locations in the centrifuge basket. A tube-sprayhead was then inserted into the empty center of the centrifuge and the 1% D. D. T. solution was sprayed into the centrifuge. Spraying was continued at the rate of 10–12 gal./min. with the centrifuge operating for about 2 minutes. Then the spray was turned off and the excess solution was centrifuged from the goods. About 12–15% of solution, that is, about .12 to .15 per cent of D. D. T. remained on the goods. Processing of the goods was completed by drying and pressing in the usual way.

Blanks taken from different locations in the centrifuge were then subjected to insect tests giving the following results:

| Treatment | Location in Centrifuge | Damage, C.M. | C.B.[1] |
|---|---|---|---|
| Untreated | | 48.6 | 31.3 |
| Spray 1% D. D. T. | Top, outside | 6.7 | 0.6 |
| Do | Middle, outside | 5.5 | 1.3 |
| Do | Bottom, inside | 4.5 | 0.8 |
| Do | Bottom, outside | 3.8 | 0.4 |

[1] Damage is measured as described in Example I.

It is to be noted that this test, which was run with a solution having a D. D. T. content considerably lower than in my professed impregnation solutions, shows a high degree of protection in spite of the low concentration of D. D. T.; and that the test clearly demonstrates the practicability of centrifuge application of the impregnation solution to the fabric.

It is to be understood that technical D. D. T. which contains about 85% of the active 1,1-bis-(p - chlorophenyl) - 2,2,2 - trichlorethane is used not only in preparing stock solutions, as in the foregoing examples, but also in preparing dry powders for addition to dry-cleaning solvents.

It will, of course, be apparent that treatment of materials with my new mothproofing compositions is not limited to dry-cleaning processes. New woolen fabrics, furs, felts, and other fibrous materials which are subject to insect attack can be treated in like manner for protection during initial storage and early use.

Modifications may be made in carrying out the present invention without departing from the spirit and scope thereof, and I am to be limited only by the appended claims.

I claim:

1. A mothproofing composition adapted for application to fibrous materials from organic solvent solution, said composition consisting essentially of 1,1-bis-(p-chlorophenyl)-2,2,2-trichlorethane and about 2 to 15% of its weight of a resin plasticizer selected from the class consisting of dibutyl phthalate, tri-o-cresyl phosphate, and methyl abietate as an agent for preventing crystallization of the 1,1-bis-(p-chlorophenyl)-2,2,2-trichlorethane when the composition is applied to fibrous material.

2. A mothproofing composition adapted for application to fibrous materials from organic solvent solution, said composition consisting essentially of 1,1-bis-(p-chlorophenyl)-2,2,2-trichlorethane and about 2 to 15% of its weight of dibutyl phthalate as an agent for preventing crystallization of the 1,1-bis-(p-chlorophenyl)-2,2,2-trichlorethane when the composition is applied to fibrous material.

3. A mothproofing composition adapted for application to fibrous materials from organic solvent solution, said composition consisting essentially of 1,1-bis-(p-chlorophenyl)-2,2,2-trichlorethane and about 2 to 15% of its weight of tri-o-cresyl phosphate as an agent for preventing crystallization of the 1,1-bis-(p-chlorophenyl)-2,2,2-trichlorethane when the composition is applied to fibrous material.

4. A mothproofing composition adapted for application to fibrous materials from organic solvent solution, said composition consisting essentially of 1,1-bis-(p-chlorophenyl)-2,2,2-trichlorethane and about 2 to 15% of its weight of methyl abietate as an agent for preventing crystallization of the 1,1-bis-(p-chlorophenyl)-2,2,2-trichlorethane when the composition is applied to fibrous material.

5. A mothproof fibrous material characterized as having bonded to individual fibers thereof a deposit of a composition consisting essentially of 1,1 - bis - (p - chlorophenyl) -2,2,2-trichlorethane and about 2 to 15% of its weight of a resin plasticizer selected from the class consisting of dibutyl phthalate, tri-o-cresyl phosphate, and methyl abietate as an agent for preventing crystallization of the 1,1-bis-(p-chlorophenyl)-2,2,2-trichlorethane on said fibres.

6. A process for mothproofing woolen fabric that comprises saturating such fabric with an impregnating solution comprising dry cleaners solvent having dissolved therein 2 to 4% by weight of a mothproofing composition composed of 1,1-bis-(p-chlorophenyl)-2,2,2-trichlorethane and about 2 to 15% of its weight of a resin plasticizer selected from the class consisting of dibutyl phthalate, tri-o-cresyl phosphate, and methyl abietate as an agent to prevent crystallization of the 1,1-bis-(p-chlorophenyl)-2,2,2-trichlorethane on the fabric, removing impregnating solution from the fabric until the amount of residual solvent is about 10 to 20% based upon the dry weight of the fabric, drying the fabric to remove the 10 to 20% of residual solvent in the fabric, thereby obtaining a mothproof fabric coated with 0.2 to 0.4% by weight of said composition.

ERNST A. WOLFF.

REFERENCES CITED

The following references are of record in the file of this patent:

UNITED STATES PATENTS

| Number | Name | Date |
|---|---|---|
| 2,193,742 | Rohm et al. | Mar. 12, 1940 |
| 2,234,501 | Nusslein et al. | Mar. 11, 1941 |
| 2,267,617 | Mitchell | Dec. 23, 1941 |
| 2,282,181 | Guinzberg | May 5, 1942 |
| 2,312,710 | Gordon | Mar. 2, 1943 |
| 2,407,668 | Leatherman | Sept. 17, 1946 |

FOREIGN PATENTS

| Number | Country | Date |
|---|---|---|
| 601,666 | Great Britain | Sept. 7, 1945 |

OTHER REFERENCES

Cumar—Paracoumarone—Indene Resin, page 21, published by Barrett Co., N. Y. city, 1936.

Ethocel Handbook, pages 32–33, published by Dow Chemical Co., 1940.

American Dyestuff Reporter, June 19, 1944, pages 282–283 (The story of D. D. T.).

Jr. Soc., Chemical Industry, October 1945, page 296 (Hayhurst article—Action on insects of fabrics impregnated with D. D. T.

Soap and Sanitary Chemicals, Nov. 1945, pages 110–111 (Jones et al. article—Solvents for D. D. T.).